Patented Jan. 18, 1938

2,105,670

UNITED STATES PATENT OFFICE 2,105,670

MANUFACTURE OF IRON OXIDE PRODUCTS

Robert L. Perkins, East Aurora, N. Y., assignor to National Aniline and Chemical Company, Inc., New York, N. Y., a corporation of New York No Drawing. Application January 20, 1934, Serial No. 707,545

10 Claims. (Cl. 134—59)

This invention relates to the manufacture of iron oxide pigments or rouges. It is especially directed to improvements in the manufacture of such products from the black iron oxide residues or sludges obtained as a by-product in the manufacture of aniline by the reduction of nitrobenzene with metallic iron, or in other reduction processes involving the use of metallic iron and resultant formation of black iron oxide residues. These residues are mainly the ferroso-ferric oxide ($Fe_3O_4$) but contain up to 15% of metallic iron and some carbon and perhaps ferric oxide and ferrous oxide. Although the residue is customarily referred to as a "black" residue, it sometimes has a brownish appearance after drying. This is probably caused by the formation of small quantities of rust on the free iron present.

It is well known that iron oxide residues may be converted to a red-colored pigment, (rouge), by subjecting it to an oxidizing roasting or calcination.

In accordance with my invention iron oxide pigments or rouges are obtained possessing a brighter and deeper color than those ordinarily obtained by the calcination of these iron oxide residues, and furthermore, my invention permits the calcination to be effected at substantially lower temperatures than those formerly employed yet with the production of iron oxides of as good or better color.

In accordance with my invention the calcination of the iron oxide residue is effected in the presence of a halide. The calcination otherwise may be effected in the usual manner, for example by roasting in a muffle furnace or other suitable apparatus in the presence of air. The quantity of the halide present during the calcination need not be large and from ¼% to 5% produces a great improvement in the color of the product and considerably lowers the required roasting temperature. I employ those halides which will yield a calcined product containing no substantial quantities of water-soluble salts. Suitable halides for this purpose are those which upon calcination decompose and are expelled from the iron oxide or those which form insoluble residues prior to or during the calcination. The preferred halides of this invention are metal chlorides which may be represented by the formula $ACl_x$ wherein A represents $NH_4$, Fe, Ca, Ba, or Sr, and $x$ represents an integer equal to the valence of A. Thus such halides are ammonium chloride, which decomposes under the conditions of calcination, the resultant products being expelled from the iron oxide, ferric chloride and ferrous chloride, which undergo decomposition to form iron oxide, and calcium, barium, and strontium chlorides, which under the conditions of calcination in the presence of sulfates are converted to water-insoluble sulfates. The iron chlorides may be formed in the residue by treatment with hydrochloric acid, if desired.

By the use of a halide in accordance with my invention, the temperatures of calcination may be reduced 20° to 100° C. below those necessary to produce pigments of the same brightness of shade and depth of color in the absence of the halide.

In its preferred embodiment my invention involves a calcination of the iron oxide sludge in an oxidizing atmosphere either after the sludge has been treated with sulfuric acid or in the presence of ammonium sulfate. The calcination may be effected without such sulfuric acid treatment and in the absence of ammonium sulfate, but in this case slightly inferior results are obtained. In general, the amount of sulfuric acid employed should be insufficient to completely combine with all of the iron oxide present in the sludge. When an alkaline-earth-metal halide is used in the calcination, the sulfuric acid (or sulfate) should be present in sufficient amount to react with the halide and convert it to insoluble sulfate. Preferably an additional amount is used which theoretically is only sufficient to convert from about one-tenth to one-third of the iron oxides contained in the sludge to iron sulfate. The sulfuric acid employed may be a commercial concentrated sulfuric acid or it may be the spent sulfuric acid resulting from the treatment of organic compounds with mixed sulfuric and nitric acids. As an example of such a spent acid may be mentioned the acid obtained in the dinitration of chlorbenzene. Such an acid usually contains from 65% to 80% $H_2SO_4$, around one-half to 1% nitric acid and the remainder chiefly water. When ammonium sulfate is employed it also is preferably employed in an amount theoretically sufficient for the conversion of one-tenth to one-third of the iron oxides contained in the sludge.

The following examples illustrate several methods for applying the present invention to the calcination of aniline sludge. Proportions of materials are expressed as parts by weight. In each case the calcination was effected in a muffle furnace in the presence of air.

*Example 1.*—10 parts of wet iron oxide sludge containing about 80% of solids were mixed with 1 part of 96% sulfuric acid, and the mixture was allowed to stand between five and ten minutes.

A portion of this mixture was dried in an oven at 80–100° C. and was then ground to a powder.

8 parts of the dry powder thus obtained were heated in a muffle furnace at a temperature of about 730° C. for about one-half hour. The product was a red pigment.

*Example 2.*—Another portion was similarly treated, the calcination being carried out at 630° C. The resulting product was a pigment of yellowish-brown color.

*Example 3.*—26 parts of an iron oxide sludge-sulfuric acid mixture, prepared as in Example 1, were uniformly mixed with 1 part of ferric chloride and 10 parts of water and the resultant mixture dried at between 80° and 100° C. The dried product was then powdered.

8 parts of the resulting powder were heated in a muffle furnace at about 730° C. for about one-half hour. The shade of the product calcined after the addition of ferric chloride was redder and brighter than that of the sample calcined at the same temperature without the addition of the ferric chloride as described in Example 1.

*Example 4.*—8 parts of a ferric chloride-iron oxide-sulfuric acid mixture were prepared, dried, and ground in the manner of Example 3. The resulting powder was heated at 630° C. for about one-half hour. The calcined product was not as red as that of Example 3 wherein the sample containing ferric chloride was heated to 730° C. but was much redder than the sample of Example 2 calcined at 630° C. without the addition of ferric chloride.

*Example 5.*—26 parts of an iron oxide sludge-sulfuric acid mixture, prepared as in Example 1, were mixed with 1 part of barium chloride dissolved in 10 parts of water. After the materials were uniformly mixed, the mixture was dried in an oven at between 80° and 100° C. The dried mixture was then ground to a powder.

8 parts of the resulting powder were heated in a muffle furnace at about 730° C. for about one-half hour. The shade of the resulting product was similar to that of the product obtained in Example 3 by calcination of the iron oxide mixture containing ferric chloride.

*Example 6.*—8 parts of a barium chloride-iron oxide-sulfuric acid mixture were prepared, dried, and ground as in Example 5. The resulting powder was heated at 630° C. for about one-half hour. The shade of the resulting product was about the same as that of the sample of Example 1 wherein the iron oxide sludge-sulfuric acid mixture was heated to a temperature a hundred degrees hotter without the addition of a halide. In this case, therefore, to obtain the same shade of iron oxide product, a hundred degree C. lower calcining temperature may be employed using about 5% of barium chloride (based on iron oxide) than without the addition of this salt.

*Example 7.*—26 parts of an iron oxide sludge-sulfuric acid mixture, prepared as in Example 1, were mixed with 1 part of calcium chloride dissolved in 10 parts of water. The mixture was then dried and ground to a powder.

8 parts of the dry powder were heated in a muffle furnace at about 630° C. for about one-half hour. The resulting product was a bluish red pigment as compared with the yellowish-brown color of the pigment obtained in Example 2 by heating the iron oxide sludge-sulfuric acid mixture at 630° C. without the addition of the metal chloride.

*Example 8.*—25 parts of wet iron oxide sludge containing about 80% of black iron oxide is intimately mixed with 1 part of ammonium chloride and 3 parts of ammonium sulfate, and the mixture dried and calcined in a muffle furnace at a temperature of 700° C. for about 30 minutes. The resulting calcined product is redder and brighter than the product obtained in a similar manner in the absence of ammonium chloride.

I claim:

1. The method of preparing an iron oxide pigment from a black iron oxide residue, which comprises calcining the black iron oxide residue in admixture with ammonium chloride.

2. The method of preparing an iron oxide pigment from a black iron oxide residue, which comprises calcining the black iron oxide residue in admixture with an iron chloride.

3. The method of preparing an iron oxide pigment from a black iron oxide residue which comprises mixing the black iron oxide residue with an inorganic, non-metal sulfate in amount sufficient theoretically to form sulfate from not more than about one-third of the iron oxide present in the iron oxide residue, mixing the product with on the order of ¼% to 5% of a chloride of the general formula $ACl_x$, wherein A represents $NH_4$, Fe, Ca, Ba, or Sr, and $x$ represents the valence of A, and roasting the mixture in the presence of air at a temperature above 630° C.

4. The method of preparing an iron oxide pigment from a black iron oxide residue which comprises mixing the black iron oxide residue with a spent aqueous sulfuric acid containing from 60% to 85% $H_2SO_4$ in amount sufficient theoretically to form sulfate from not more than about one-third of the iron oxide present in the iron oxide residue, mixing the resultant mass with on the order of ¼% to 5% of a chloride of the general formula $ACl_x$, wherein A represents $NH_4$, Fe, Ca, Ba, or Sr, and $x$ represents the valence of A, and roasting the mixture in the presence of air at a temperature above about 630° C.

5. The method of preparing an iron oxide pigment from a black iron oxide residue, which comprises mixing the iron oxide residue with a member of the group consisting of sulfuric acid and ammonium sulfate and calcining the product in admixture with calcium chloride.

6. The method of preparing an iron oxide pigment from a black iron oxide residue, which comprises mixing the iron oxide residue with a member of the group consisting of sulfuric acid and ammonium sulfate and calcining the product in admixture with between about ¼% and about 5% calcium chloride.

7. The method of preparing an iron oxide pigment from a black iron oxide residue, which comprises mixing the black iron oxide residue with a member of the group consisting of sulfuric acid and ammonium sulfate in an amount sufficient to form sulfate from not more than ⅓ of the iron oxide present in the iron oxide residue, mixing the product with calcium chloride, and calcining the mixture.

8. The method of preparing an iron oxide pigment from a black iron oxide residue, which comprises mixing the black iron oxide residue with a spent aqueous sulfuric acid containing from 60% to 85% $H_2SO_4$ in sufficient quantity to dissolve not more than about ⅓ of the iron oxide present in the iron oxide residue, mixing the resultant mass with calcium chloride, and subjecting the mixture to a roasting in the presence of air at a temperature above about 360° C.

9. The method of preparing an iron oxide pigment from a black iron oxide residue, which comprises mixing the iron oxide residue with a member of the group consisting of sulfuric acid and ammonium sulfate and calcining the resultant product in admixture with ¼% to 5% of a chloride of the general formula $ACl_x$ wherein A represents $NH_4$, Fe, Ca, Ba, or Sr, and $x$ represents the valence of A.

10. The method of preparing an iron oxide pigment from a black iron oxide residue, which comprises mixing the iron oxide residue with a member of the group consisting of sulfuric acid and ammonium sulfate and calcining the resultant product in admixture with a chloride of the general formula $ACl_x$, wherein A represents $NH_4$, Fe, Ca, Ba, or Sr, and $x$ represents the valence of A.

ROBERT L. PERKINS.